United States Patent [19]

Kamlukin et al.

[11] 3,731,557
[45] May 8, 1973

[54] PLANETARY TRANSMISSION

[75] Inventors: Igor Kamlukin, Mequon; Peter P. Konyha, Port Washington, both of Wis.

[73] Assignee: Simplicity Manufacturing Company, Inc., Port Washington, Wis.

[22] Filed: Mar. 29, 1972

[21] Appl. No.: 239,245

[52] U.S. Cl. .......................74/792, 74/203, 74/220
[51] Int. Cl......F16h 57/10, F16h 15/00, F16h 11/02
[58] Field of Search.......................74/792, 203, 220; 192/11

[56] References Cited

UNITED STATES PATENTS

| 2,935,901 | 5/1960 | Petronovich | 74/792 |
| 2,957,561 | 10/1960 | Musgrave | 192/11 |
| 3,132,539 | 5/1964 | Hotz | 74/792 |
| 3,319,493 | 5/1967 | Halls et al | 74/792 |
| 3,539,040 | 11/1970 | Edwards | 192/11 |
| 3,572,170 | 3/1971 | Tashiro | 74/792 |
| 3,688,604 | 9/1972 | Schlosser | 74/792 |

Primary Examiner—Arthur T. McKeon
Attorney—Kenneth C. McKivett et al.

[57] ABSTRACT

This invention is concerned with the combination of a spur gear planetary transmission and a split sheave power input clutched by a V-belt.

8 Claims, 6 Drawing Figures

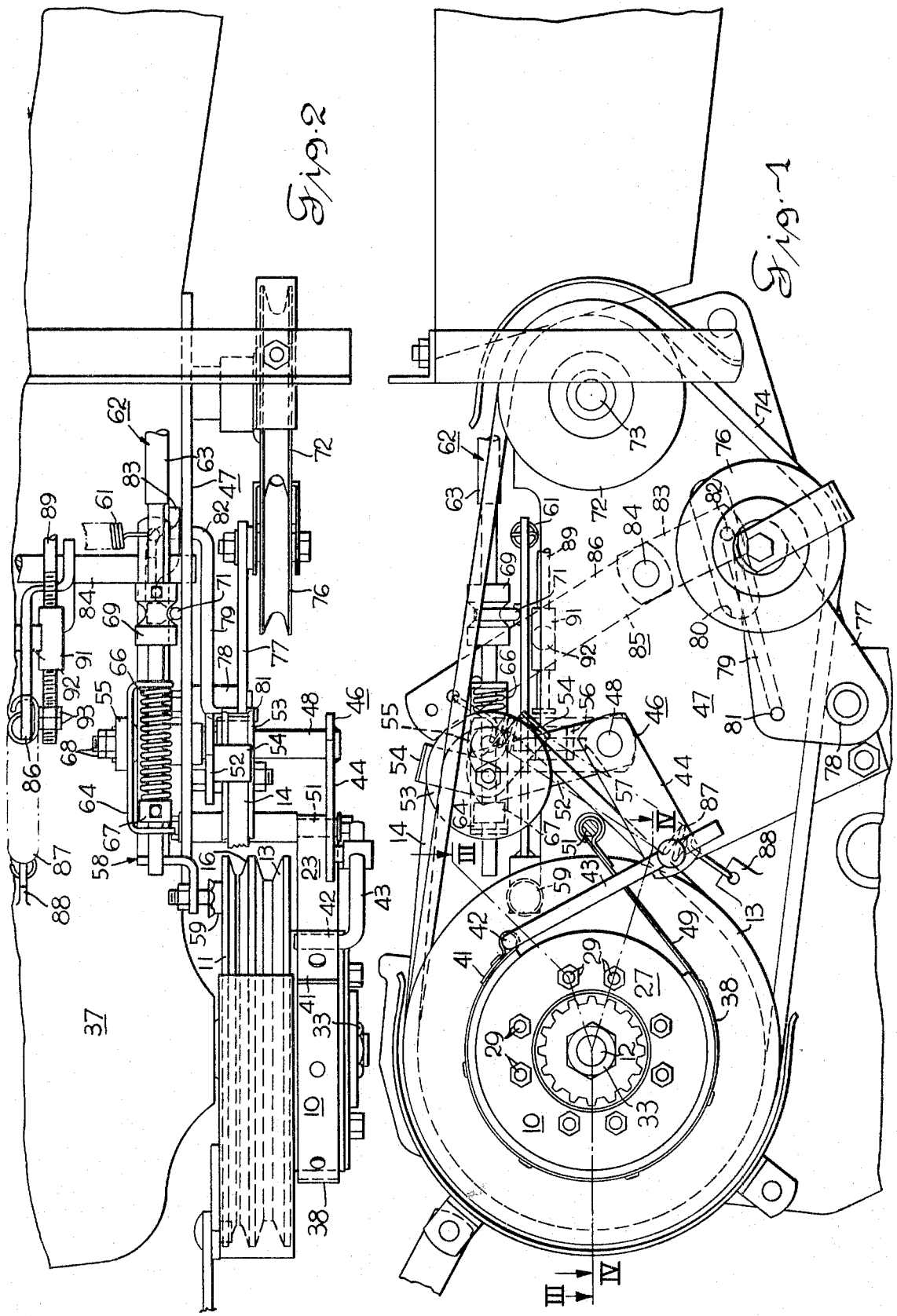

PLANETARY TRANSMISSION

The object of this invention is to provide a simple and effective means for easily and quickly reversing the direction of a drive shaft in a tractor.

A further object is to accomplish this desired result with an inexpensive mechanism.

A further object of this invention is to provide brake means for controlling a driven mechanism and which means are automatically operated in response to shifting a control mechanism to either a forward or reverse speed.

Another object of this invention is to provide an inexpensive combination of a split sheave with a spur gear planetary assembly.

Another object of this invention is to provide a direct forward drive which is accomplished by tightening a V-belt about a split sheave keyed to an output shaft and about a power input sheave mounted on a power output shaft.

FIG. 1 is a side elevation view of the planetary transmission, sheaves and hand and foot controls concerned with this invention;

FIG. 2 is a top view of the mechanism shown in FIG. 1;

Figure 3:
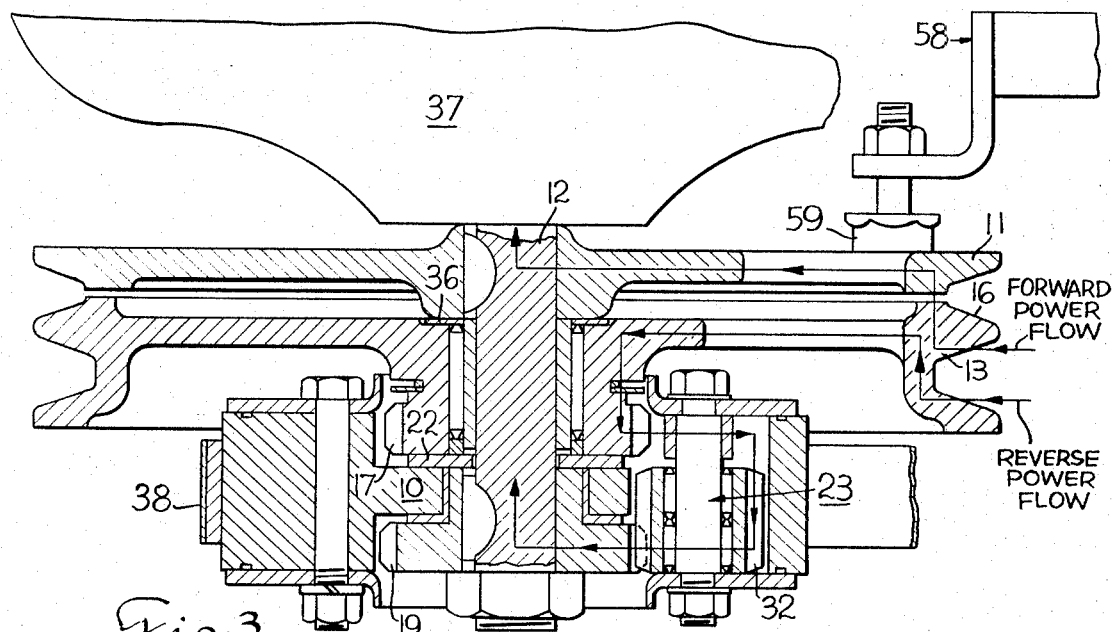
FIG. 3 is a cross sectional view taken generally on line III—III of FIG. 1 and illustrating the power flow.

Referring to FIG. 2 a planetary transmission 10 is provided including a sheave half 11 which is keyed to a power output shaft 12. A sheave 13 is positioned proximate to sheave half 11 so that a V-belt 14 can be positioned between sheave half 11 and the adjacent surface 16 of sheave 13 to establish a driving relation therebetween. In other words, when belt 14 is tightened up sufficiently, sheave half 11 moves with sheave 13 as though it were directly attached thereto. Sheave 13 is attached to a hub portion of gear 17 (see FIG. 5) which hub portion is positioned about shaft 12 and spaced therefrom by roller bearing assembly 18. A spur gear 19 is attached to shaft 12 by key 21. A thrust washer 22 separates gear 17 from gear 19. A planetary assembly 23 is positioned to encircle an indented portion 24 of gear 19 and is spaced therefrom by flange bearing 26. Planetary assembly 23 includes a planetary carrier 27 to which are bolted differential covers 28 by bolts and nuts 29. Planetary carrier 27 also rotatably supports two pairs of differential pinions 31 and 32 through the medium of bolts and nuts 29. Gear 19 is retained on shaft 12 by means of nut 33 threadably connected to the outboard end of shaft 12 for retaining gear 19 abutting thrust washer 22 which in turn abuts gear 17. Gear 17 abuts thrust bearing 36 which contacts sheave half 11 which in turn abuts transmission housing 37 (see FIG. 2).

As shown in FIG. 2 the periphery of planetary assembly 23 is provided with a flat belt 38 forming a brake band relative thereto for keeping the planetary assembly 23 from rotating when desired. The peripheral surface of planetary assembly 23 may be configured to accept a V-belt 39 (FIG. 5 and 6) which upon being tightened will function as a brake on the assembly.

Referring to FIGS. 1 and 2, one end of belt 38 is attached to a coupling member 41 in which a turned over portion 42 of one end of a rod 43 is pivotally received. The other end of rod 43 is pivotally attached to one arm 44 of a bell crank lever 46 carried by frame member 47 for pivotal movement about shaft 48 which is journaled in frame member 47. The other end of flat belt 38 is attached to a connector 49 which in turn is connected to pivot pin 51 carried by frame member 47. Another arm 52 of bell crank lever 46 has a sheave 53 rotatably attached thereto. V-belt 14 passes about sheave 53. Guards 54 carried by arm 52 prevent V-belt 14 from coming off sheave 53 when the belt is slack. Still another arm 55 of bell crank 46 is attached to shaft 48 adjacent the end thereof opposite to the end to which arm 44 is attached. A bracket 56 (FIG. 1) attached to frame member 47 supports a vertically extending pivot pin 57 upon which is pivotally mounted a brake assembly 58. At one end assembly 58 is provided with a brake pad member 59 coactable with sheave half 11 for braking same. The other end of assembly 58 is provided with a spring 61 which biases pad member 59 into contact with sheave half 11. A hand control mechanism 62 includes means for retaining pad member 59 out of contact with sheave half 11 when sheave 53 is swung to a position tightening belt 14 on sheave half 11 and side 16 of sheave 13. Control mechanism 62 includes a rod member 63 upon which is slidably mounted a rod guide 64. A spring 66 encircles rod member 63 and is restrained by one leg of guide 64 and a stop member 67 attached to rod 63. A bolt and nut 68 pivotally connects guide 64 to arm 55.

A cam member 69 is attached to rod 63. Brake assembly 58 includes a vertically extending pin 71 attached thereto which coacts with cam member 69.

As shown in FIGS. 1 and 2 spring 61 is pivoting brake assembly 58 about pivot pin 57 causing brake pad 59 to engage half sheave 11 tending to brake same. At the same time belt 14 is relaxed from half sheave 11 because sheave 53 has been moved to the left as viewed in FIG. 2. When hand control 62 is pulled to the right, pin 71 will be cammed downwardly producing a pivotal movement of brake assembly 58 about pivot pin 51 and thereby releasing contact between brake pad 59 and sheave half 11. This pull on hand control 62 also causes spring 66 to become compressed against the right-hand leg of guide 64 resulting in guide 64 and arm 55 moving toward the right which results in a tightening action on belt 14 as sheave 53 moves to the right. As sheave 53 moves to the right or clockwise about shaft 48 as viewed in FIG. 1, arm 52 moves likewise therewith as does arm 44 resulting in a loosening of brake band 38.

When belt 14 is tightened on half sheave 11 and sheave 13 resulting in them revolving in unison, this results in a forward drive to transmission housing 37. A drive sheave 72 is attached to drive shaft 73 journaled in frame 47. Drive shaft 73 is operatively connected to a source of power (not shown). A drive belt 74 drivingly connects drive sheave 72 to driven sheave 13. An adjustable idler sheave 76 is rotatably mounted on a link plate member 77 which is pivotally mounted on pin 78 carried by plate 77. A rod 79 has one turned over end portion 81 pivotally received in link plate member 77. Rod 79 passes through an opening 80 in frame member 47. The other end of rod 79 is provided with a turned over portion 82 pivotally received in the distal end of arm 83 which is attached to shaft 84 journaled in frame 47 to form a bell crank lever 85. Shaft 84 is provided at its other end with an arm 86 which is connected to one end of spring 87 having its other end connected to a spring clip attached to frame member 88 for biasing arm 86 in a counterclockwise direction about shaft 84 as viewed in FIG. 1.

A foot clutch rod 89 has its left-hand end as viewed in FIGS. 1 and 2 slidably received in a collar member 91 which has a pivot member 92 attached thereto and received in an opening in a midportion of arm 86. The left-hand end of rod 89 is threaded to receive a pair of stop nuts 93. The right-hand end of rod 89 is provided with conventional means such as detent members (not shown) for retaining rod 89 in a desired rearward position, the bias of spring 87 thereby retaining plate 77 in its pivoted position with sheave 76 tightening belt 74 to provide a driving relation between sheave 72 and sheave 13 or for retaining rod 89 in a desired forward position relaxing belt 74 and thereby interrupting the drive from sheave 72 to sheave 13.

The right-hand end of hand control rod 63 is provided with conventional means (not shown) for retaining such right-hand end in any of three positions: a first or forward position wherein belt 14 is tightened about sheaves 53 and sheave half 11 and the side 16 of sheave 13 while removing brake 59 from contact with sheave half 11 and loosening brake band 38 allowing movement of planetary carrier 27; a second or reverse position wherein belt 14 is relaxed so that sheave 13 moves independently of sheave half 11 while brake 59 is again removed from contact with sheave half 11 and brake band 38 is tightened so that planetary carrier 27 remains stationary; and a third or neutral position wherein belt 14 is relaxed so that sheave 13 moves independently of sheave half 11 which is braked by contact with brake member 59 and brake band 38 is relaxed so that planetary carrier 27 revolves about shaft 12.

Referring to FIG. 3, the power flow is demonstrated, when it is desired to drive shaft 12 forwardly, hand control 62 (FIG. 2) is moved to the right, this causes cam 69 to move pin 71 downwardly causing brake member 59 to move out of contact with sheave half 11. Such movement of control 62 also causes sheave 53 to move to the right and thus tighten belt 14 about sheave half 11 and the side 16 of sheave 13 so that they will move in unison. Referring back to FIG. 3 the power enters sheave 13 and is transferred to sheave half 11 which is keyed to shaft 12 and so drives same. When belt 14 was being tightened belt 38 was being loosened so planetary assembly 23 will rotate with shaft 12.

Figure 4:
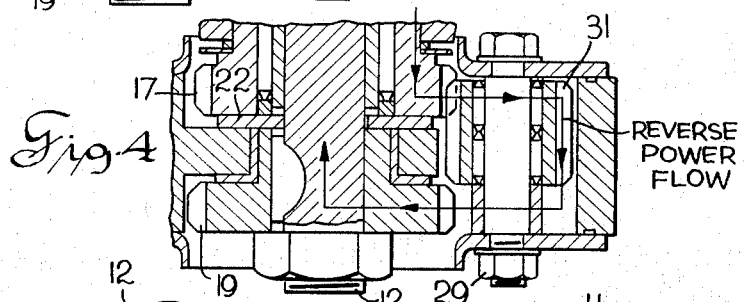
FIG. 4 is a cross sectional view taken on line IV—IV of FIG. 1 showing the pinion associated with the reverse power flow.

When it is desired to drive shaft 12 in reverse hand control 62 is moved to the left, this causes cam 69 to move pin 71 downwardly causing brake member 59 to move out of contact with sheave half 11. Such movement of control 62 also causes sheave 53 to move to the left and thus loosen belt 14 about sheave half 11 and the side 16 of sheave 13 so that sheave half 11 no longer moves in unison with sheave 13. When belt 14 was being loosened belt 38 was being tightened so planetary assembly 23 remains stationary. So power enters from sheave 13 to sungear 17 to which it is attached. Gear 17 is meshed with differential pinions 31 (see FIG. 4) which is meshed with pinion 32 (FIG. 3). Pinion 32 meshes with gear 19 which is keyed to shaft 12 so that the power flow is from sheave 13 to gear 17 to pinion 31 to pinion 32 to gear 19 to shaft 12.

When desired control assembly 62 can be shifted to a mid-position or neutral. This is accomplished by moving assembly 62 to the left a lesser amount than described in the preceding paragraph. This movement is insufficient to cause cam 69 to contact pin 71 and move brake 59 out of contact with sheave half 11. This movement is, however, sufficient to move belt 14 out of contact with sheave half 11. Such movement of control 62 is not sufficient to tighten up belt 38. Accordingly, power flows from belt 14 to sheave 13 to pinion 31 to pinion 32 but instead of pinion 32 driving gear 19, the planetary assembly 23 rotates about gear 19 and shaft 12 which remains stationary.

Figure 5:
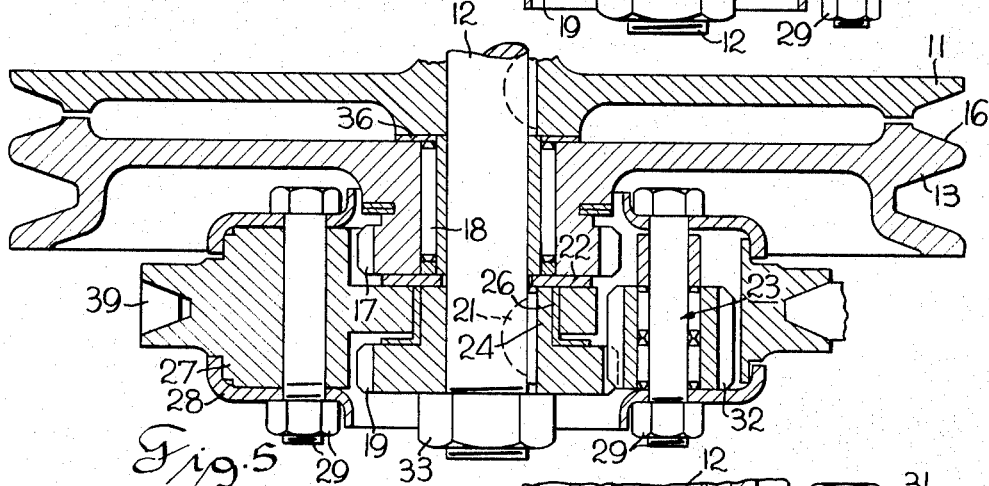
FIG. 5 is a cross sectional view similar to FIG. 3 but using a V-belt to brake the planetary carrier.
Figure 6:
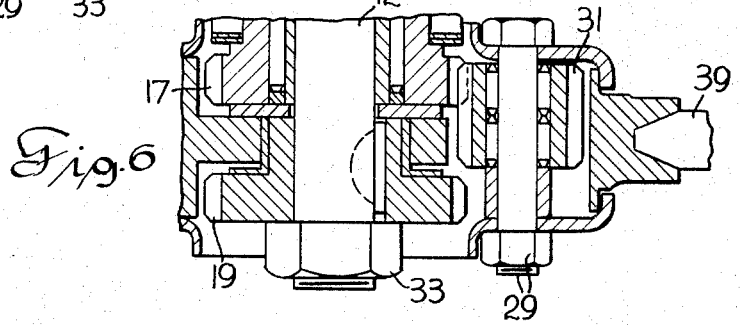
FIG. 6 is a cross sectional view similar to FIG. 4 using a V-belt as in FIG. 5.

FIGS. 5 and 6 indicate the use of a V-belt to brake the planetary carrier 27 in place of the flat belt 38 used in the other figures.

The embodiments of the invention in which an exclusive property or privilege is claimed as defined as follows:

1. In combination a power output shaft, a power input shaft, a first sheave attached to said output shaft, a second sheave rotatably mounted on said power input shaft, a first belt drivingly connected between said first and second sheaves, a sheave half keyed to said input shaft in proximity to said second sheave, an adjustable belt tightening sheave mounted on one arm of a bell crank in alignment with said sheave half and one side of said second sheave, a second belt circling said belt tightening sheave and said sheave half and said one side of said second sheave, said second sheave being attached to a sun gear of a spur gear differential positioned about said input shaft, said differential including a planetary carrier, first means for braking said planetary carrier, said first means including a third belt positioned about said planetary carrier and tightenable to prevent rotation of said carrier, said first means being actuated by movement of another arm of said bell crank, and control means connected to a third arm of said bell crank so that movement of said control means in one direction causes said second belt to tighten and said third belt to loosen to provide a forward rotation of said driven shaft and movement in an opposite direction causes said second belt to loosen and said third belt to tighten to provide a reverse rotation of said driven shaft.

2. The combination as recited in claim 1 and wherein brake means for said sheave half are provided, said brake means being actuable by movement of said control means for moving said bell crank to apply said brake means to said sheave half when said bell crank is loosening said second belt.

3. The combination as recited in claim 2 and wherein said brake means is biased into contact with said sheave half and said control means includes a cam coactable with brake means when said control means are moved for removing said brake means from contact with said sheave half.

4. The combination recited in claim 1 and wherein an adjustable belt tightening sheave is provided for said first belt, and manually operated means for moving said belt tightening sheave into contact with said first belt to provide a drive between said first sheave and said second sheave and to interrupt such drive.

5. In the combination recited in claim 1 and wherein said second belt is a V-belt.

6. In the combination recited in claim 1 and wherein said third belt is a V-belt.

7. In the combination recited in claim 1 and wherein said third belt is a flat belt.

8. In the combination recited in claim 1 and wherein a limited movement of said control means in said opposite direction causes said second and third belts to loosen to provide a neutral nonrotating position of said power input shaft.

* * * * *

UNITED STATES PATENT OFFICE
CERTIFICATE OF CORRECTION

Patent No. 3,731,557    Dated May 8, 1973

Inventor(s) Igor Kamlukin et al.

It is certified that error appears in the above-identified patent and that said Letters Patent are hereby corrected as shown below:

Column 4, line 30, "output" should read -- input --; in each of lines 31, 33 and 41, "input" should read -- output --; in each of lines 52 and 55, "driven" should read -- output --; Column 6, line 8, "input" should read -- output --.

Signed and sealed this 7th day of January 1975.

(SEAL)
Attest:

McCOY M. GIBSON JR.
Attesting Officer

C. MARSHALL DANN
Commissioner of Patents